Jan. 8, 1929.
P. E. HAWKINSON
1,697,955
PROCESS FOR MAKING TIRE PATCHES
Filed Aug. 25, 1925   4 Sheets-Sheet 1
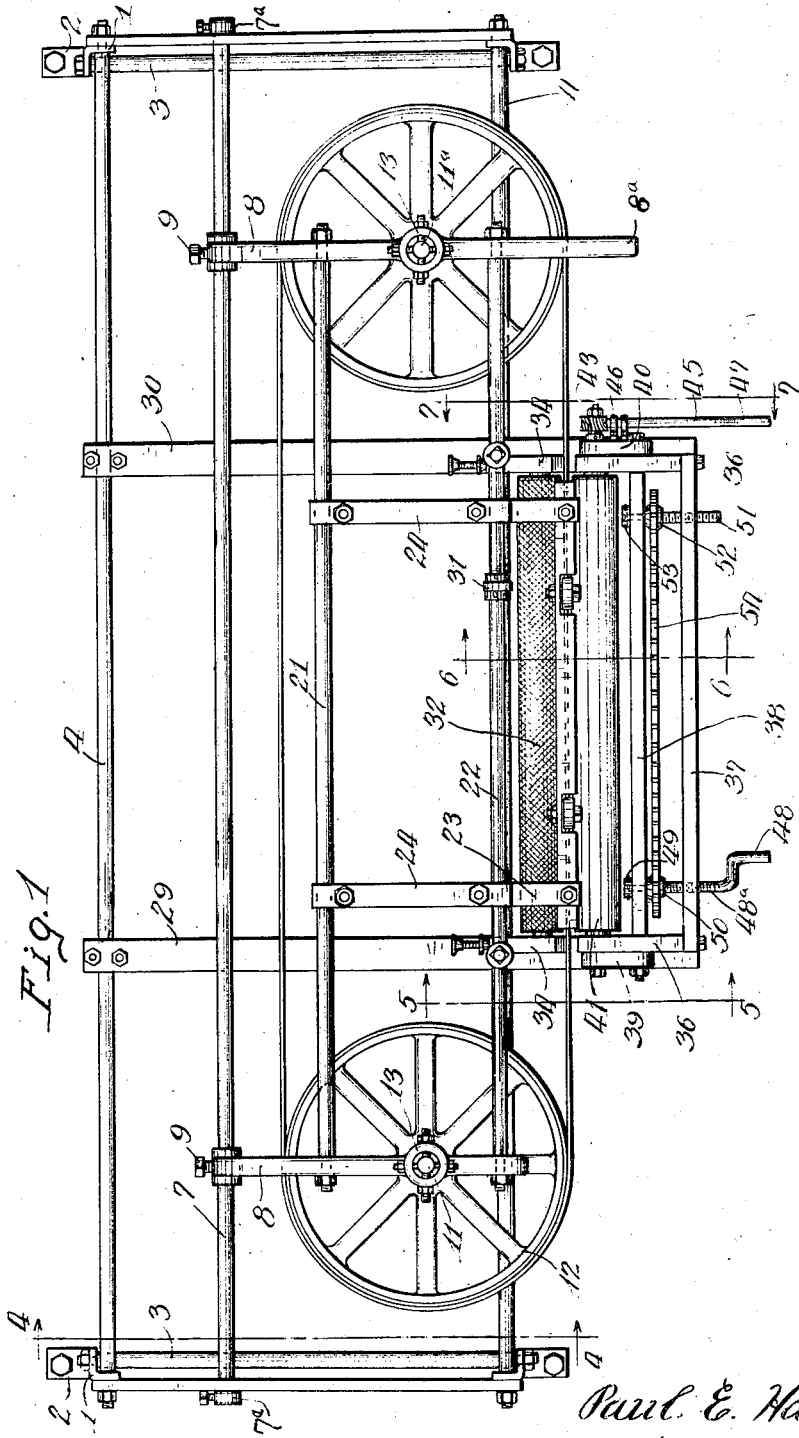
Inventor
Paul E. Hawkinson
By Williams, Bradbury,
McCaleb + Hinkle, Attys Jan. 8, 1929.
P. E. HAWKINSON
1,697,955
PROCESS FOR MAKING TIRE PATCHES
Filed Aug. 25, 1925 4 Sheets-Sheet 2
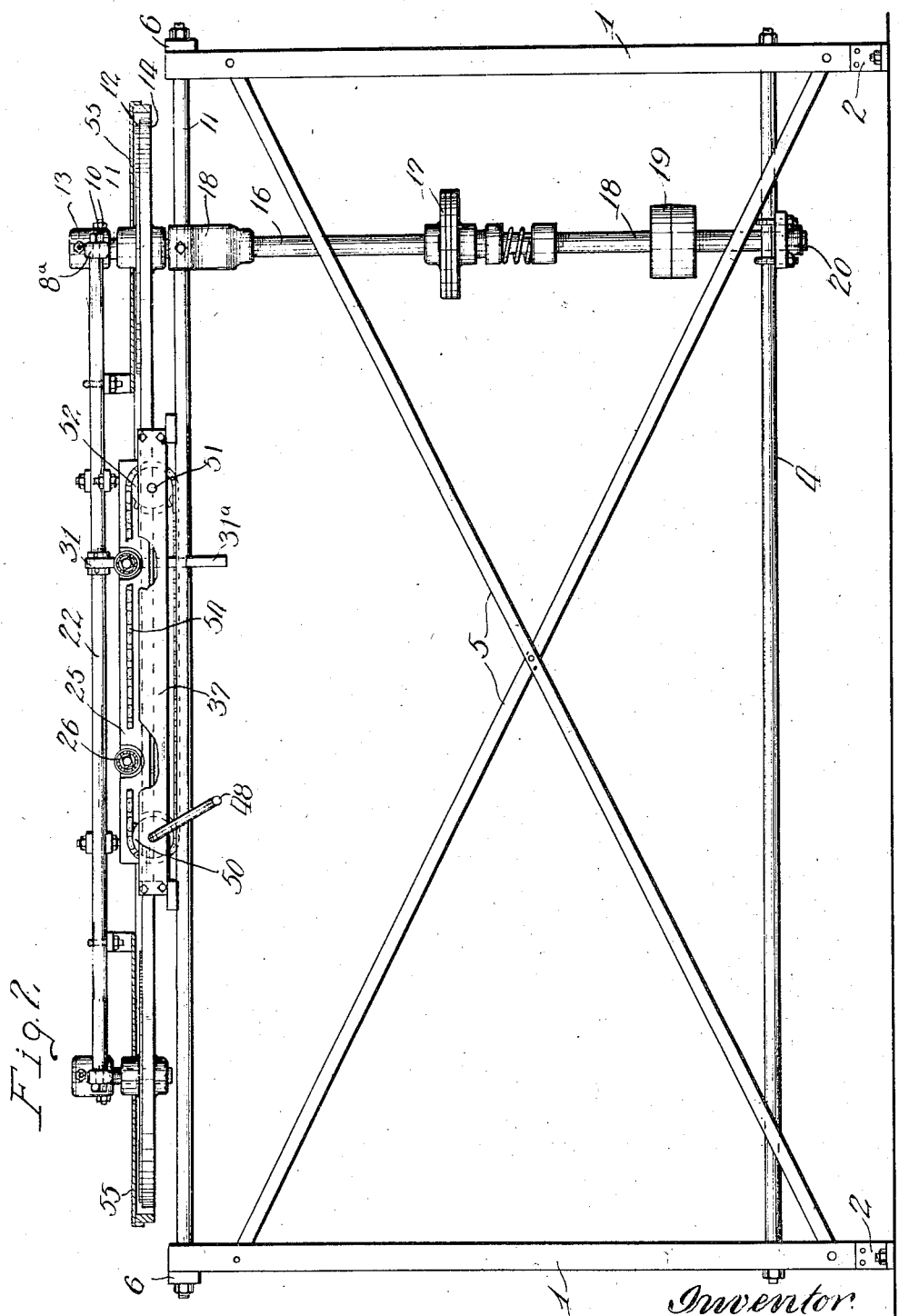

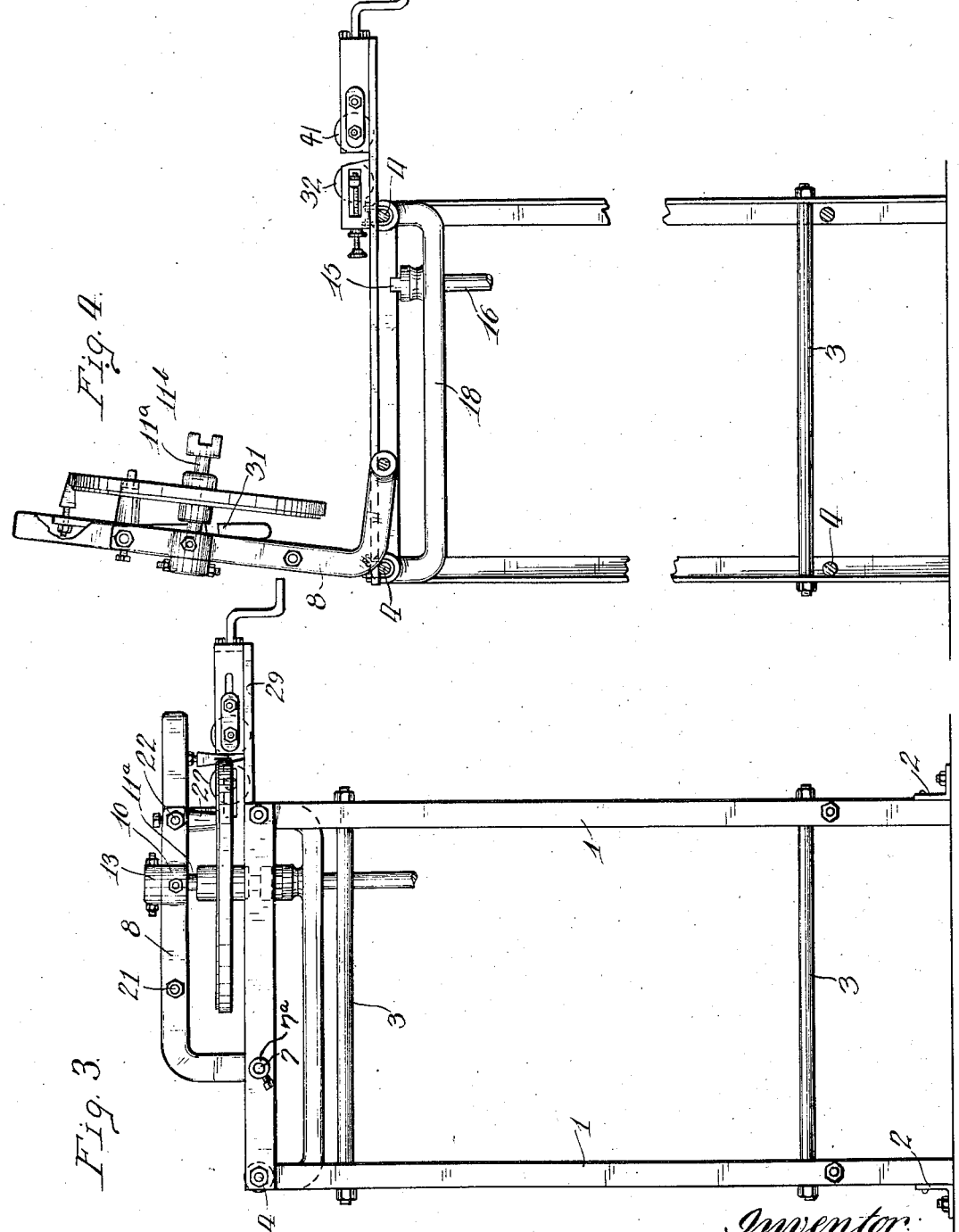

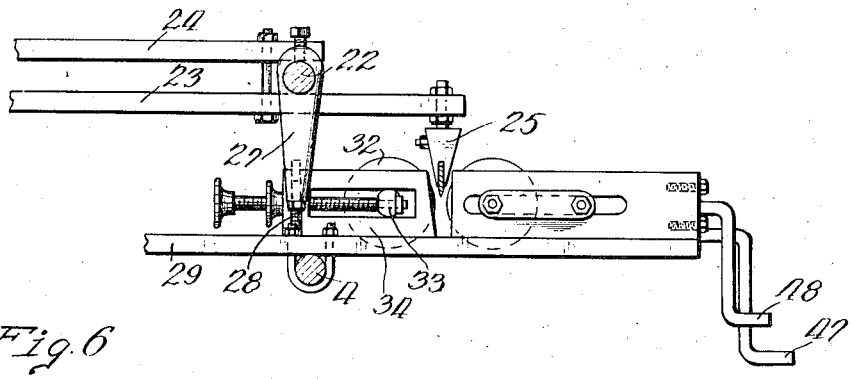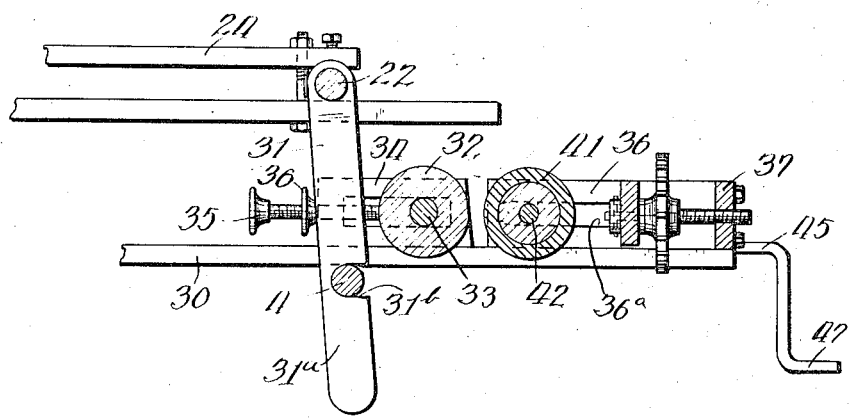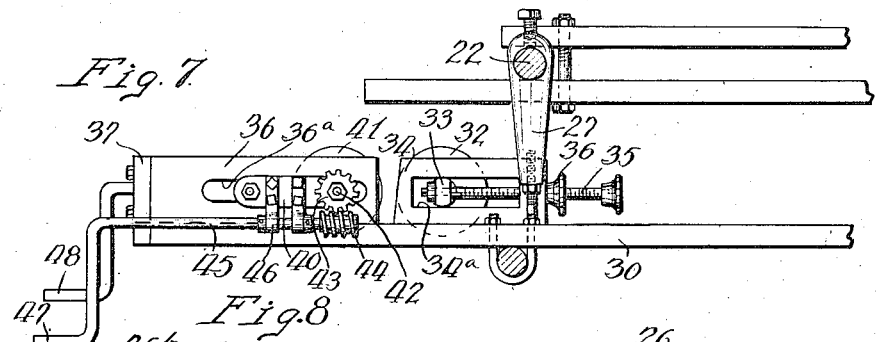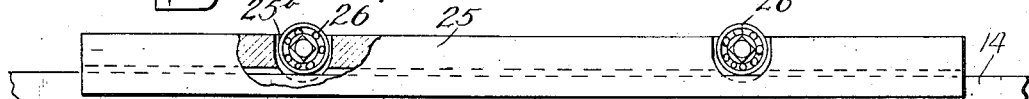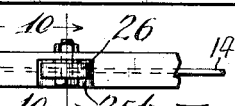

Patented Jan. 8, 1929.

1,697,955

UNITED STATES PATENT OFFICE.

PAUL E. HAWKINSON, OF MINNEAPOLIS, MINNESOTA, ASSIGNOR TO KEHAWKE MANUFACTURING CO., OF MINNEAPOLIS, MINNESOTA, A CORPORATION OF MINNESOTA.

PROCESS FOR MAKING TIRE PATCHES.

Application filed August 25, 1925. Serial No. 52,474.

My invention relates to an improved tire patch and to a process and machine for producing the same. The patch is an improvement upon the patch set forth in my Patent No. 1,436,394, dated November 21, 1922. The process and machine are adapted for the making of the improved patch, preferably by cutting the desired number and shape of plies or layers from the carcasses of used tires.

In the usual method heretofore employed in making patches for repairing pneumatic tire casings, as set forth in my above mentioned patent, it has been the practice to strip or pull the desired number of plies or layers of fabric and interposed rubber from the carcass of a used tire; cut the removed layers or plies to the desired shape (usually round) and then skive the edge so that a neat or flat joint may be made with the carcass of the tire to be repaired. When the plies for patch material are removed from the tire carcass in this manner, the separation is usually uneven, the interposed layer of rubber adhering in places to the surface of the removed plies and in other places to the remaining carcass. The surfaces of the patch material are therefore apt to be uneven, covered with a layer of rubber in some portions and substantially free of rubber in other portions. Because of this uneven cleavage when the pulling method of separation is employed, it has been the practice to buff the surfaces of the patch material to remove any traces of the rubber layer adhering thereto and to thereby give the surfaces a uniform exposure of fabric. Unless the buffing of this surplus rubber from the surfaces of the patch is very carefully done the fabric is apt to become loosened and parts thereof removed, thus reducing its strength to some extent. The use of such fabric faced patches in repairing tires according to the method set forth in my previously mentioned patent ordinarily requires that, before the patch is placed, one or both of its fabric faces be covered or coated with a thin layer of gum rubber or similar material. These extra steps of removing the uneven layer of original rubber and then applying the thin and uniform coating of new rubber adds to the labor and expense of making the patches. Furthermore, this application of uncured rubber to the surfaces of the patch material does not always produce a thorough union between the rubber and the buffed fabric, such, for example, as exists between the layers of fabric and vulcanized rubber of a tire casing. It has also been found that, in pulling the patched material from the carcass, the fabric at the plane of cleavage is oftentimes injured because of the tendency to deform and tear the fabric and to stretch and displace the strands of which it is composed.

The principal object of my present invention is to provide a patch having the same general type and characteristics of that disclosed in my previously mentioned patent, but which is covered on either or both of its surfaces with a thin and uniform layer of the original interposing layer of vulcanized rubber; and to provide a process and a machine whereby such patches or patch material may be taken from the carcasses of used tires.

I prefer to take the patch material from used tires because the plies are firmly welded or cemented together, all of the stretch has been removed from the fabric so that the patch will remain in position and will not bulge, the material is formed to the shape of the tire to be repaired, and furthermore the materials ordinarily used in tire manufacture are of a better grade and quality than can be obtained upon the market merely for tire repair purposes.

Another object of my invention is to provide a machine which is simple in construction and operation and is adapted to slice rubber and other similar materials into sheets of desired thickness.

A further object is to provide a machine which is particularly adapted to cut one or more plies of fabric from a pneumatic tire casing.

A further object is to provide a machine for the above mentioned purposes, in which the cutting means is readily removable from operative position and to provide means for automatically connecting the cutting means to the driving means when the cutting means is moved to operative position.

A further object is to provide a novel form of cutting means and a novel means for supporting, driving and adjusting the same.

A further object is to provide a novel form of adjustable feeding means for feeding the tire casing to the cutting means.

A further object is to provide a novel form of tire patch.

Other objects will appear from the following description in which:

Figure 1 is a plan view of my machine showing the parts in normal position;

Figure 2 is a front elevation of the machine with portions cut away to better show the operative parts;

Figure 3 is a left side elevation showing the cutting knife in operative position;

Figure 4 is a vertical cross-section taken on the plane represented by the line 4—4 in Figure 1, showing the cutting means in inoperative position;

Figure 5 is a vertical section taken on the plane represented in line 5—5 in Figure 1, showing the parts in operative position;

Figure 6 is a similar section taken on the plane represented by the line 6—6 in Figure 1, showing latching bar which holds the parts in operative position;

Figure 7 is a detailed section taken on the plane represented by the line 7—7 in Figure 1 and showing particularly the means for operating the feeding rollers;

Figure 8 is a detailed elevation of the knife guide means, partly broken away to show the roller;

Figure 9 is a plan view of the knife guide means, and

Figure 10 is a vertical section of the knife guide means taken on the plane represented by the line 10—10 in Figure 9.

My machine is mounted on a structural frame consisting of four vertical legs 1 which may be secured to the floor by angle iron clips 2. Transverse cross rods 3 and longitudinal rods 4 are bolted to these legs 1. Crossed tie members 5 are secured to these vertical members 1 for additional strength and rigidity. At the top of the frame transverse bars 6 are secured and form the bearing support for the knife frame supporting shaft 7, the knife frame consisting of L-shaped arms 8 which are secured at one end to the shaft 7 by means of set screws 9. The right hand arm 8 (Figure 1) is extended at 8$^a$ to form a handle by which the frame may be raised. The L-shaped members 8 have bearings 10 formed therein adapted to receive the shafts 11 and 11$^a$ upon which the pulleys 12 are secured. Collars 13 are secured by set screws to the upper end of the shafts 11 and 11$^a$, the lower surface of these collars forming a bearing surface for the shafts 11.

The endless band knife 14 is carried by the pulleys 12 being driven by the right hand pulley (Figures 1 and 2) which is fixed on the shaft 11$^a$. A morticed member 11$^b$ (Figure 4) is secured to the end of the shaft 11$^a$ and, when the knife frame is in lowered operative position, is adapted to engage the tenon member 15 secured to the upper end of a power shaft 16, rotatably held in the bearing support 18 which at its ends is fixed to the upper longitudinal rods 4.

The shaft 16 may be directly connected to a motor or other suitable source of power or as shown in Figure 2, may be driven through a friction clutch 17 partly carried by a shaft 18 which carries a pulley 19 and is suitably supported for rotation in a bearing support 20 which is clamped to the lower longitudinal rods 4.

Bolted between the L-shaped members 8 are the rods 21 and 22 which aid in making the knife frame rigid and also serve to hold the guide supports 23 which are clamped to these bars by means of bolts which pass through the supports and also through similar but shorter clamping bars 24. The knife guide 25 is bolted near its ends to the ends of the support bars 23.

The guide 25, as is best shown in Figures 5, 8, 9, and 10, is triangular in cross-section and at its downwardly pointing apex has a full length slot 25$^a$ of sufficient width and depth to receive the major portion of the band knife 14 which moves longitudinally therethrough and is guided thereby. Mounted in recesses 25$^b$ formed in the upper portion of the guide 25 at suitable intervals, are the antifriction means which serve to apply downward pressure to the band knife, here illustrated as ball bearing rollers 26.

As said before, the shaft 7 and consequently the entire knife supporting frame, may be pivotally moved relative to the main frame. When in raised or inoperative position the elbows of the L-shaped members 8 engage the upper rear longitudinal rod 4 and the frame is thus held in approximately vertical position as is shown in Figure 4. It is desirable to have the lower operative position adjustable, and to accomplish this a pair of arms 27 are secured to the rod 22 and are adapted to have their ends engage bolts 28 which are vertically adjustable in the feeding means supporting bars 29 and 30 respectively. A suitable latching lever 31, pivoted on the bar 22 and having a handle portion 31$^a$ and an open slot 31$^b$ which is adapted to engage the rod 4, is provided to lock the band knife support frame in lower operative position.

A knurled or roughened feed roller 32 is rotatably supported on a shaft 33 which at its ends is carried by a pair of guide blocks 34 having slots 34$^a$. These guide blocks are carried by the bars 29 and 30 respectively. A pair of adjusting screws 35 are screw threaded through the blocks and have their ends rotatably secured to the ends of the shaft 33. Suitable locking thumb nuts 36 are threaded on these screws so that the roller may be securely held in adjusted position.

Secured at the end of the bars 29 and 30 is a second pair of guide blocks 36 to which is bolted a bar 37. Another bar 38 extends through the slots 36ª in the blocks 36 and at its ends is bolted to the links 39 and 40 respectively. A roller 41 having an outer surface of soft rubber or similar material which is adapted to conform to irregularities in the surface of the material to be cut and thus tend to equalize the distribution of the pressure of the roll upon the material, is fixed to a shaft 42. the ends of which extend through the slots 36ª and are journaled in the links 39 and 40 respectively. A worm wheel 43 is fixed to the right hand (Figure 1) end of the shaft 42 and is engaged for rotation by a worm 44 which is keyed to a shaft 45 carried in bearings 46 attached to the link 40. A crank handle 47 is shown integral with the worm shaft 45. The tire or other material being sliced is fed upwardly to the band knife by manually turning this crank. It is to be understood however that the feed can readily be made automatic by connecting this shaft with the drive shaft by suitable gearing.

In order to grip the tire or similar stock between the rollers, the roller 41 may be moved toward the roller 32. This is accomplished by turning the crank 48 integral with the screw 48ª which is threaded through the left-hand end portion of the bar 37 and at its end is rotatably mounted in the bar 38, being prevented from axial movement therein by the collar 49 and the sprocket 50 which are fixed to the screw. A similar screw 51 carrying a similar sprocket 52 and collar 53 is similarly mounted in the bars 37 and 38. A chain 54 connects these sprockets. It will be seen that movement of the screw 48ª will thus be directly communicated to the screw 51 so that the bar 38 and consequently both ends of the roller 41 will be moved equal distances.

In Figure 2, guards 55 are shown attached to the band knife frame to protect the operator from the pulleys and knife.

To operate the machine, the roller 32 is first adjusted to be the exact distance from the cutting edge of the band knife necessary to cut the desired number of plies of fabric from the tire. The blocks 34 may be suitably graduated adjacent the slots 34ª and a vertical center line marked on the ends of the shaft 33 in order to facilitate this adjustment. The end of a tire (which has first been transversely severed) is flattened and inserted between the rollers from below with the fabric side towards the roller 32. The handle 48 is then turned until the end of the tire is securely clamped between the rollers. The band knife frame is then brought down to operative position, and held there by means of latch lever 31. It will be remembered that when the knife is moved to operative position, a driving connection to the knife is automatically established through the mortice and tenon connection, so that upon putting the friction clutch into engagement the knife will start moving and the tire casing may be fed upwardly by turning the crank 47. The wedge-shaped portion of the guide 25 guides the severed portions of the tire casing away from the knife, thus permitting the knife to evenly cut into the rubber between the plies of fabric, reducing friction, and preventing the sides of the knife from rubbing the rubber surface from the material.

The adjustment of the rollers is sufficiently sensitive to make it possible to slice the plies of fabric from the tire casing by cutting through the rubber layer between the plies of fabric with such accuracy that no buffing is required to fit the material for use. The operation may be repeated until a different number of plies are desired or a different type of tire casing is to be used.

The patch disclosed herein forms the subject matter of my co-pending divisional application, Serial No. 240,353, filed December 16, 1927, and the machine herein disclosed is shown and claimed in my co-pending application, Serial No. 240,354, filed December 16, 1927.

It is to be understood that although I have described my invention as adapted to slice fabric from the casings of tires, I do not wish to limit myself to such use, for it is apparent that my machine is capable of a great variety of uses. My invention is also capable of wide variation within equivalent limits and I contemplate such variation as may be desirable or useful in the particular adaptation of the invention shown, or in its adaptation to other machines. I do not restrict myself in any unessential particulars, but what I claim and desire to secure by Letters Patent is:—

1. The method of making pneumatic tire casing patches which consists in severing a plurality of plies of fabric from a used tire casing by cutting through the layer of rubber between the plies of fabric.

2. The method of making tire patching material which consists in cutting a used pneumatic tire casing transversely and then severing plies of fabric from said casing by cutting through the intermediate layers of rubber, whereby the fabric of the severed patch will have a thin substantially uniform layer of rubber upon the surface formed by the cutting operation.

3. The process of making tire patching material from tire carcasses having plies of fabric vulcanized together by intermediate layers of rubber, which consists in severing plies of fabric from the carcass by cutting through the intermediate layers of rubber.

4. The process of making tire patching material which consists in taking a plurality of plies of fabric vulcanized together by intermediate layers of rubber, which fabric has been stretched to conform to the shape of a tire casing, and severing a plurality of plies of fabric from said material by cutting through the intermediate layers of rubber.

5. The process of making tire patching material from tire carcasses having plies of fabric vulcanized together by intermediate layers of rubber, which consists in flattening the tire carcass, severing a plurality of plies of fabric from the carcass by cutting through the intermediate layers of rubber, cutting out circular tire patches from said plies, and skiving the edges of the circular patches.

6. The method of forming a tire repair sheet from the inner fabric body of an old tire casing, which consists in cutting through the fabric body of the tire casing at a uniform distance from the inner face thereof and through one of the layers of vulcanized rubber uniting the fabric plies of the casing and thereby providing the convex face of the repair sheet with a vulcanized rubber film having a smooth, uniform cut surface, substantially as described.

7. The method of producing tire repair material from a tire carcass composed of alternate layers of fabric and vulcanized rubber, which comprises taking from the carcass a sheet of material of the desired number of layers by cutting through a layer of the rubber between two adjacent layers of fabric, leaving a fully exposed thin film of the original vulcanized rubber on each of the fabric layers that originally were adjacent and joined to each other by the cut layer of rubber.

In witness whereof, I hereunto subscribe my name this 20th day of August, 1925.

PAUL E. HAWKINSON.